United States Patent
Reinartz et al.

[11] Patent Number: 6,078,118
[45] Date of Patent: Jun. 20, 2000

[54] ELECTRIC MOTOR-PUMP ASSEMBLY

[75] Inventors: Hans-Dieter Reinartz, Frankfurt am Main; Dieter Dinkel, Eppstein/Ts, both of Germany

[73] Assignee: ITT Manufacturing Enterprises Inc., Wilmington, Del.

[21] Appl. No.: 09/043,776

[22] PCT Filed: Aug. 3, 1996

[86] PCT No.: PCT/EP96/03433

§ 371 Date: Oct. 16, 1998

§ 102(e) Date: Oct. 16, 1998

[87] PCT Pub. No.: WO97/13067

PCT Pub. Date: Apr. 10, 1997

[51] Int. Cl.⁷ ..................................................... H02K 5/00
[52] U.S. Cl. .............................. 310/89; 310/67 R; 310/239; 417/542; 417/273; 417/271; 417/360
[58] Field of Search .............................. 310/87, 88, 67 R, 310/89, 239; 417/415, 273, 366, 360, 269, 542, 534, 271

[56] References Cited

U.S. PATENT DOCUMENTS

| | | | |
|---|---|---|---|
| 3,413,929 | 12/1968 | Cook | 103/174 |
| 4,518,326 | 5/1985 | Peruzzi et al. | 417/372 |
| 4,861,234 | 8/1989 | Joy | 417/273 |
| 4,988,147 | 1/1991 | Zirps | 303/116 |
| 5,039,283 | 8/1991 | Mergenthaler et al. | 417/273 |
| 5,100,305 | 3/1992 | Zirps | 417/521 |
| 5,105,685 | 4/1992 | Yoshida | 74/606 R |
| 5,213,482 | 5/1993 | Reinartz et al. | 417/273 |
| 5,576,586 | 11/1996 | Blumenberg | 310/88 |
| 5,620,311 | 4/1997 | Wetzel | 417/415 |
| 5,650,676 | 7/1997 | Blumenberg | 310/88 |
| 5,733,108 | 3/1998 | Riffe | 417/542 |
| 5,839,349 | 11/1998 | Volz | 92/147 |

*Primary Examiner*—Nestor Ramirez
*Assistant Examiner*—Saeed Ghahramani
*Attorney, Agent, or Firm*—Rader, Fishman & Grauer PLLC

[57] ABSTRACT

The present invention discloses a combination of an electric motor and a pump with a compact design. It is important that the pump housing 9 is made of plastic material and slid into the housing periphery 2 of the electric motor so that it embraces the pump housing from the outside and thereby imparts stability to it.

The pump bores 15, 16 extend radially outwardly and are closed by plugs 22, 23 which bear against the inside of the electric motor housing 2.

Because the pump housing is made of plastic material, it can additionally be used as a brush support plate for the brushes 24, 25 of the electric motor.

8 Claims, 4 Drawing Sheets

ELECTRIC MOTOR-PUMP ASSEMBLY

BACKGROUND OF THE INVENTION

The present invention relates to an electric motor which includes a housing that is open on one side, and a motor shaft is arranged in the axis of symmetry of the housing, and a pump which is accommodated in a housing that extends in a radial direction related to the motor shaft, and ducts for guiding pump pistons are provided in the housing.

German patent application No. 43 158 26 discloses an assembly of this type wherein the pump housing has a first base surface close to the electric motor and a second base surface remote from the electric motor which each extend in a radial direction in relation to the motor shaft. To provide the motor and pump assembly, the electric motor housing with its open side is mounted on the pump housing and connected on the base side to the pump housing.

The pump housing projects in a radial direction beyond the periphery of the electric motor housing.

Therefore, an object of the present invention is to provide an easy-to-assemble electric motor and pump assembly which, in addition, has a minimum possible radial extension.

SUMMARY OF THE INVENTION

To achieve this object, the present invention proposes extending the wall portion of a bowl-shaped electric motor housing in an axial direction so that it embraces the pump housing on the outside periphery.

In this arrangement, the axes of the ducts guiding the pump pistons will be located within the electric motor housing.

In addition, the advantage of the present arrangement is that the pump ducts which open into the side wall of the pump housing need not be closed in a sophisticated fashion. Mounting a plug which is retained by the bowl wall of the electric motor housing is sufficient.

A central aperture is provided in the pump housing into which the pump ducts open, and an eccentrically designed portion of the motor shaft is disposed within the aperture.

The electric motor housing is usually made of metal because it must ensure the magnetic return path of the magnetic fields of the permanent magnets of the stator.

Because the electric motor housing embraces the pump housing and imparts sufficient stability to the pump housing, the pump housing may be made of plastic material.

Further, making the pump housing of plastic material provides the advantageous possibility of mounting the brushes of the electric motor on the first base surface, with the result that the pump housing additionally performs the function of a brush support plate.

In addition, conductor paths may be cast in the pump housing by way of which the current is conducted to the brushes.

Connecting pins project from the second base surface of the pump housing and include connecting ducts which open vertically into the pump ducts. The connecting pins are inserted into an aluminum valve housing. The aluminum housing houses ducts which, among others, accommodate the suction and pressure valves of the pumps.

The present invention will be explained in the following by way of three Figures.

Figure 1:
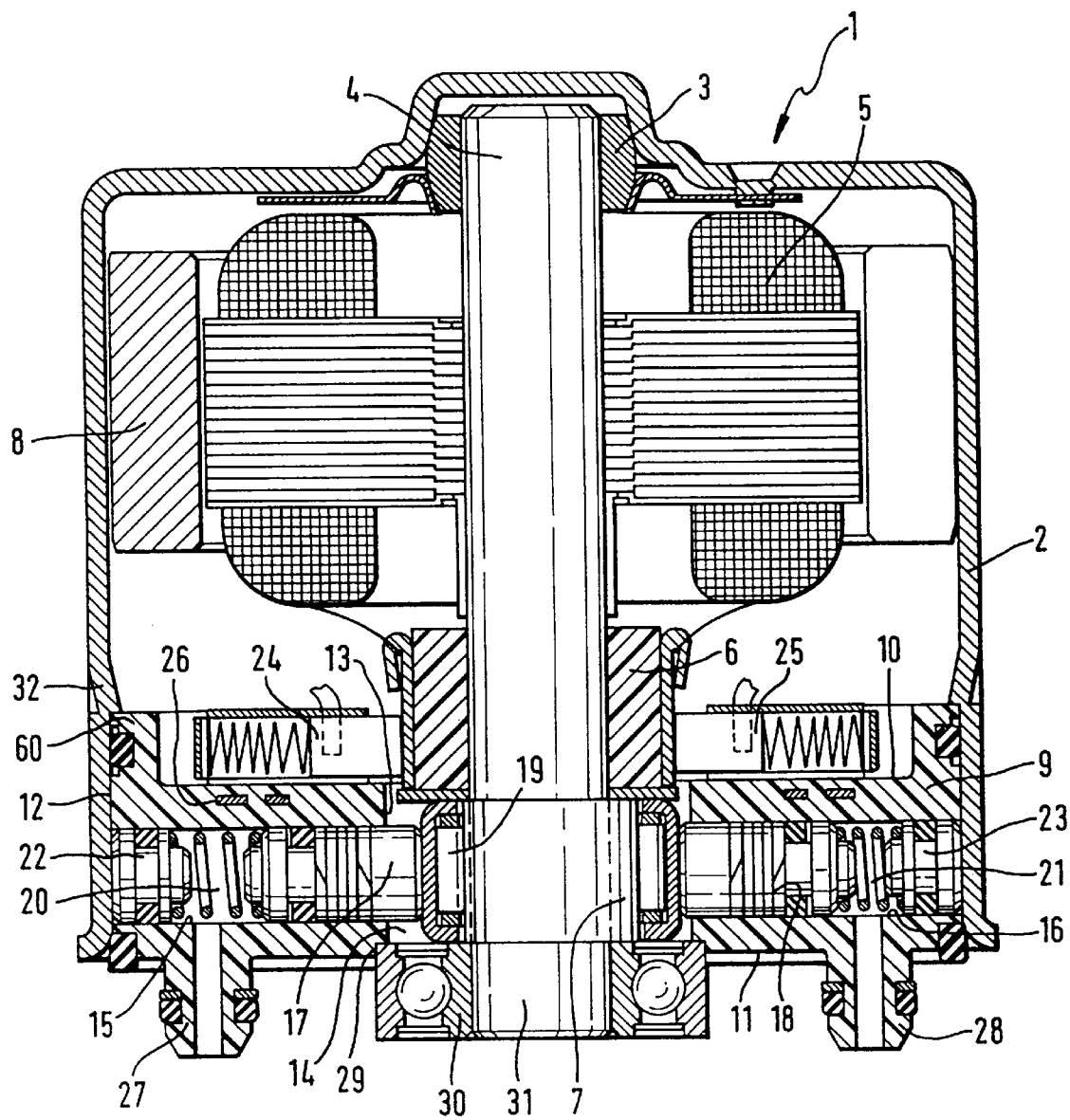
FIG. 1 is a cross-sectional view of a first embodiment of the assembly.

First of all, the embodiment of FIG. 1 is referred to.

DETAILED DESCRIPTION OF THE DRAWINGS

The electric motor 1 is a direct-current commutator motor. Its housing 2 is a deep-drawn sheet-metal bowl which is open on one side. Provided in the bottom of the housing is a first point of support 3 for a motor shaft 4 which extends in the axis of symmetry of the housing 2. The motor shaft 4 carries an armature 5, a collector 6 and an eccentric 7 which is pressed onto the smoothly abraded shaft 4. Permanent magnets 8 are attached or cemented to the inner side of the housing wall and induce a rotation of the shaft 4 in interaction with the energized armature 5.

The permanent magnets 8 and the armature 5 are arranged close to the bottom of the electric motor housing 2.

The open side of the housing bowl of the electric motor is limited by the pump housing 9. A thickened disc is referred to having a first base surface 10 which faces the electric motor, and a second base surface 11 which points outwardly and roughly ends flush with the edge of the housing bowl 2.

The outside wall 12 of the pump housing 9 has the shape of a cylinder with a diameter which corresponds to the inside diameter of the housing bowl 2. Thus, the pump housing 9 will exactly fit into the open side of the housing bowl 2. An indentation 13 in which the eccentric 7 of shaft 4 is disposed is provided in the center of the pump housing 9. The indentation 13 is configured as a central aperture 14 in the FIG. 1 embodiment.

At least two pump ducts 15, 16 extend in a radial direction in the pump housing 9, one end of each duct opening into the indentation 13 and the other end of each duct opening into the outside wall 12.

Pump pistons 17, 18 are guided in ducts 15, 16 and abut with their inward end surfaces by way of a support on the eccentric 7 of the shaft 4. The outside end surfaces of the pump pistons 17, 18 respectively confine a pump chamber 20, 21 which is limited by a plug 22, 23 towards the outside. The outside end surfaces of the plugs 22, 23 bear against the inside wall of the housing bowl 2. This means that the plugs 22, 23 do not require further attachments in the pump housing 9.

Pump housing 9 is made of plastic material. This permits attaching the brushes 24, 25 of the electric motor 1 or their casings directly to the first base surface 10 of the pump housing 9. Thus, the pump housing also performs the function of a brush support plate.

The brushes 24, 25 are energized by way of conductor paths 26 cast into the pump housing 9. The conductor paths 26 are arranged in a plane between the first base surface 10 and the pump ducts 15, 16.

Projecting from the second base surface 11 are two connecting pins 27, 28, each having a central bore which opens into the pump chambers 20, 21.

The connecting pins 27, 28 project beyond the fringe area of the housing bowl 2 and, therefore, are appropriate for insertion into corresponding accommodation recesses of a valve block.

As has been mentioned hereinabove, the indentation 13 is configured as a central aperture 14 which is step-like extended (step 29) at its end that opens into the second base surface. An outer ring of a ball bearing 30 can be slipped into the step over a partial length. The inner ring of the ball bearing 30 is slipped onto an end pin 31 of the shaft 4.

Thus, the ball bearing 30 also projects from the base surface and is appropriate for insertion into a corresponding recess of a valve housing.

In order to fix the pump housing 9 in an axial direction, one or more indentations 32 are provided in the housing bowl 2 and form a stop for the pump housing 9.

In order that the pump housing 9 can be inserted into the housing bowl 2 with greatest possible turnover resistance, its outside edge includes an inwardly peripheral projection 60, the height of which corresponds roughly to the height of the brushes 24, and the outside diameter of which corresponds to the inside diameter of the housing bowl 2. The overall axial length is thereby shortened.

Figure 2:
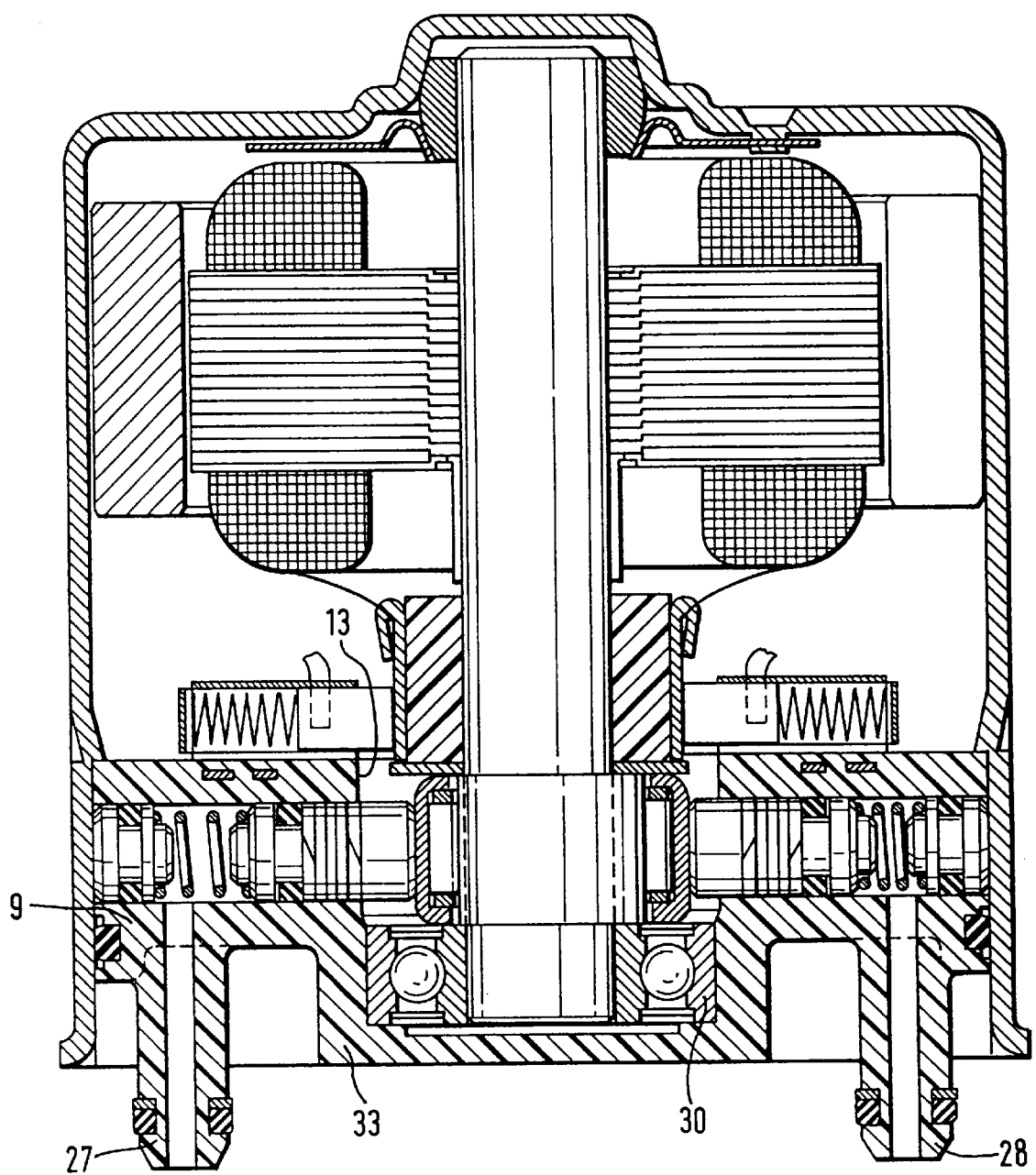
FIG. 2 is a cross-sectional view of a second embodiment of the assembly.

FIG. 2 shows a variation of the FIG. 1 embodiment. The indentation 13 is not configured as an aperture but closed outwardly by a bowl-type bearing retainer 33 designed integrally with the pump housing 9. The bowl accommodates the ball bearing 30 in its interior.

Figure 3:
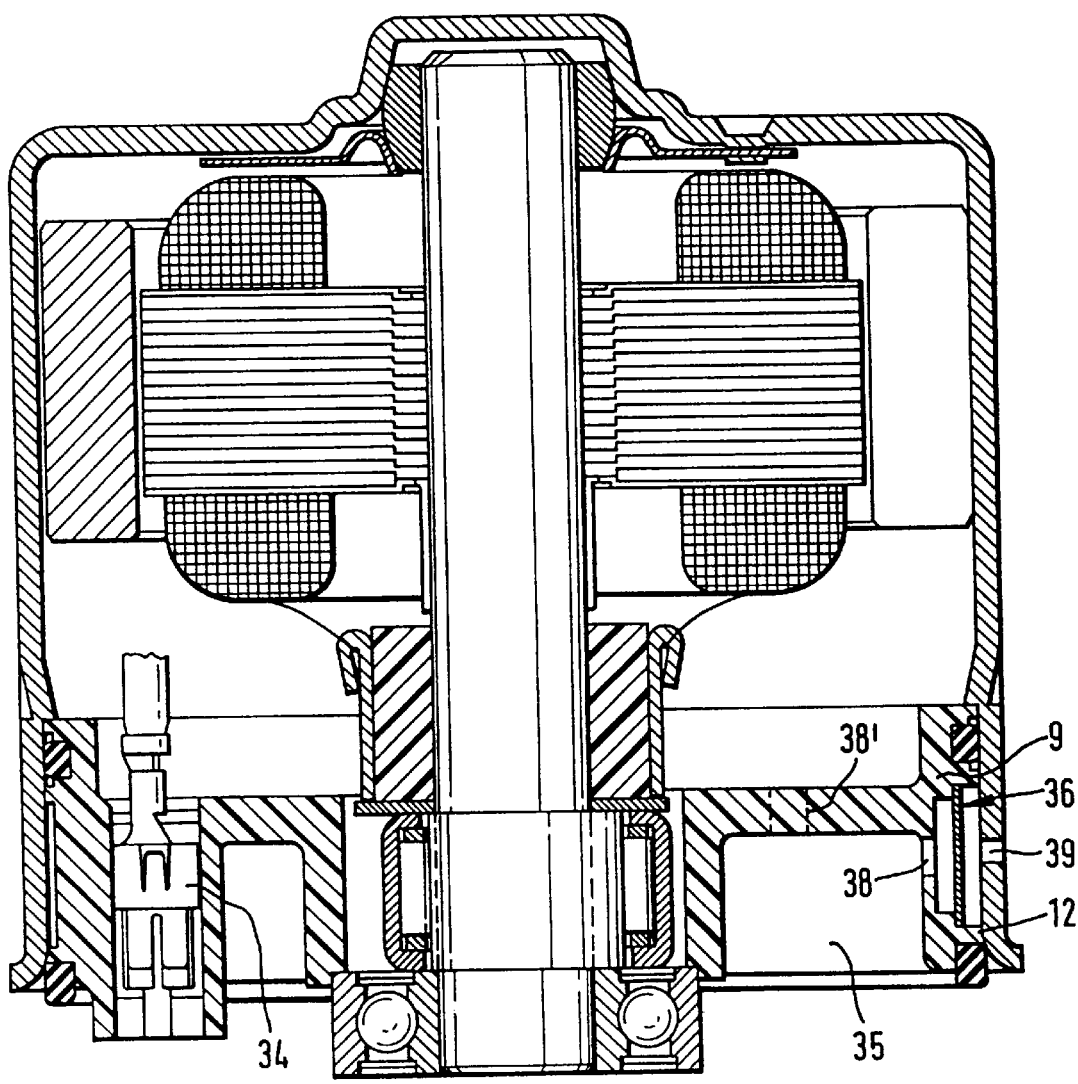
FIG. 3 is a cross-sectional view of the first embodiment of the assembly twisted by 90° in relation to the cross-sectional view of FIG. 1.

FIG. 3 shows a view, which is twisted in relation to the cross-sectional surface of FIG. 1, roughly vertically to the axis of the pump ducts. Therefore, the pump ducts cannot be seen. It may be recognized that the pump housing 9 (to the extent possible) includes recesses 35 whose purpose is to save material. Further, it can be seen that an integrated motor plug 34 is provided in the pump housing 9. Plug 34 extends in a radial direction through the pump housing and contacts the conductor paths 26 on its inward side. In the extension of the motor plug (in the valve housing which must still be described), a channel is provided through which the supply lines to the motor plug extend and by which the motor is connected to a control fitted on the other side of the valve housing.

A ventilation diaphragm 36 is inserted into an indentation in the outside wall 12 of the pump housing 9 to ventilate the interior of the motor. Indentation 36 is connected to the recesses 35 by way of a duct 38. Recesses 35, in turn, are in connection to the interior of the motor by another duct 38', which is shown in dotted lines in FIG. 3 because it does not absolutely have to be arranged in the plane shown.

The indentation, in turn, is connected to the ambient air by way of a bore 39 in the wall of the housing bowl 2 which also does not have to be arranged in the plane shown.

Figure 4:
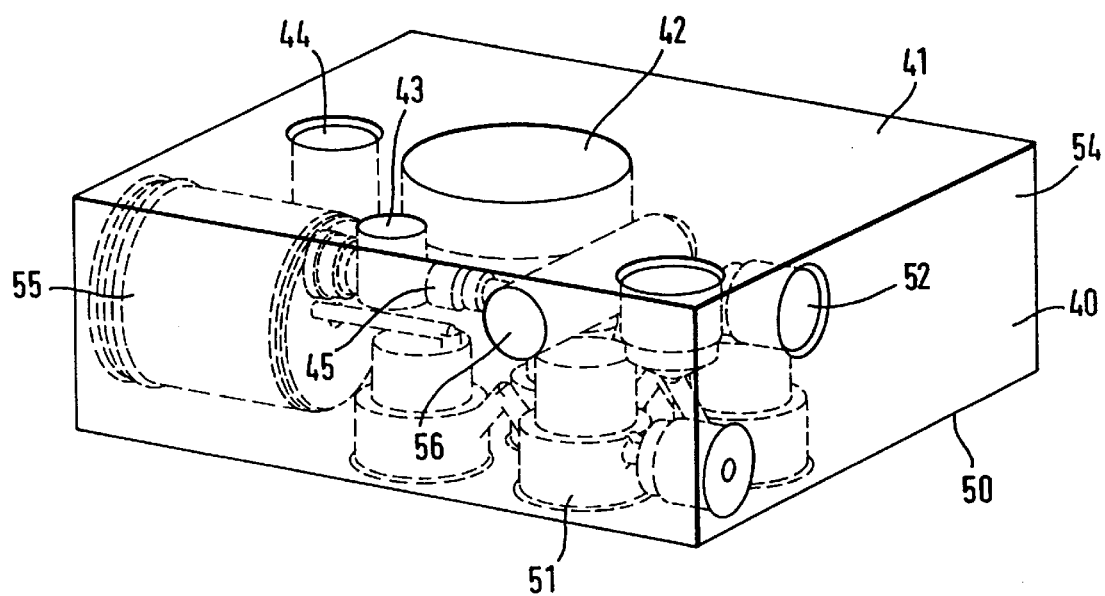
FIG. 4 is a perspective view of a valve block.

As has already been mentioned several times, the pump housing 9 is configured so that it can be slipped onto a valve block 40. FIG. 4 shows a perspective view of a valve block 40 of this type. Valve block 40 is a square-shaped aluminum block which is in contact with its first base surface 41 on the pump housing 9. Therefore, a central accommodation recess 42 is provided for the ball bearing 30. The diameter of the recess 42 corresponds to the outside diameter of the ball bearing 30. Spaced therefrom is a first pin accommodation recess 43 into which a connecting pin 27 may be slipped. Diametrically arranged to the recess 43 is another pin accommodation recess which is not shown for the sake of clarity. Offset by 90° in relation to the pin accommodation recesses 43 is a plug accommodation recess 44 into which the motor plug 34 can be inserted and through which the counterplug extends. The pin accommodation recess 43 is penetrated by a transverse duct 45 which is stepped several times. The steps are used to accommodate cartridges with non-return valves which provide the suction and pressure valves for the pumps. Opposite the first base surface 41 is a second base surface 50 which includes several valve accommodation recesses 51. Valve cartridges can be inserted herein, by which the pressure fluid supply from the pump to the connected elements is controlled.

Because the system described is preferably used in a brake system, wheel brakes are connected to wheel brake ports 52 on a side wall 54 of the valve block square, on the one hand, and, on the other hand, a master cylinder is connected which has a port in the first base surface 41.

Further elements are a low-pressure accumulator 55 and a damping chamber 56. The damping chamber is provided in a bore which opens into a lateral surface of the square that is by 90° to the side surface with the wheel brake ports.

The accommodating bore for the low-pressure accumulator 55 extends transversely to the accommodating bore for the damping chamber 56 and in parallel to the base surfaces.

We claim:

1. An electric motor and pump assembly comprising an electric motor accommodated in a housing that is open on one side and has an axis of symmetry, a motor shaft extending in the axis of symmetry of the housing, and a pump accommodated in a pump housing extending in a radial direction with respect to the axis of symmetry, the pump housing being made of plastic material and having pump ducts for guiding pump pistons, wherein the housing of the electric motor is configured as a bowl with a wall portion that embraces the pump housing on its outside, brushes of the electric motor are mounted on the pump housing, and conductor paths for current supply of the brushes extend in the pump housing.

2. The assembly as claimed in claim 1, wherein the pump ducts have axes extending within the bowl-shaped housing.

3. The assembly as claimed in claim 2, wherein the pump ducts open into a side wall of the pump housing.

4. The assembly as claimed in claim 3, wherein the pump ducts are closed by plugs which abut on the inside of the bowl-shaped housing.

5. The assembly as claimed in claim 1, wherein an aperture is included in the pump housing into which the pump ducts open and in the area of which an eccentric provided on the motor shaft is arranged.

6. The assembly as claimed in claim 1, wherein connecting pins project from the outside of the pump housing and include central apertures which are connected to the pump ducts.

7. The assembly as claimed in claim 6, wherein non-return valves which provide suction and pressure valves of the pump are mounted outside the pump housing.

8. An electric motor and pump assembly including an electric motor with a motor housing, a pump with a plastic housing which serves as a cover closing the motor housing, and a valve housing, wherein the pump housing has connecting pins which can be inserted into the valve housing.

* * * * *